United States Patent [19]

Cvacho

[11] 4,113,454
[45] Sep. 12, 1978

[54] COATING FILTER, SEPARATOR AND COLLECTOR SYSTEM

[75] Inventor: Daniel S. Cvacho, Forest, Va.

[73] Assignee: Belgium Tool & Die Co., Lynchburg, Va.

[21] Appl. No.: 727,447

[22] Filed: Sep. 28, 1976

[51] Int. Cl.² ............................................. B01D 50/00
[52] U.S. Cl. ...................................... 55/319; 55/320; 55/429; 55/436; 55/467; 118/DIG. 7; 118/326; 138/107; 98/115 SB; 248/63; 285/189
[58] Field of Search ................... 98/115 SB; 55/1, 97, 55/319, 320, 428, 429, 467, 436; 118/DIG. 7, 634, 326, 610; 248/58, 63; 138/107; 229/93; 285/189

[56] References Cited

U.S. PATENT DOCUMENTS

| 670,870 | 3/1901 | Drozeski | 248/58 |
|---|---|---|---|
| 929,270 | 7/1909 | Ashton | 55/319 |
| 1,939,151 | 12/1933 | Thompson | 55/417 |
| 2,025,946 | 12/1935 | Wenner-Gren | 55/319 |
| 2,099,756 | 11/1937 | Seigle | 138/107 |
| 3,563,006 | 2/1971 | Sutter | 55/417 |
| 3,719,030 | 3/1973 | Blankemeyer et al. | 98/115 SB |
| 3,738,091 | 6/1973 | Fesco | 55/367 |
| 3,744,222 | 7/1973 | Delao | 55/446 |
| 3,777,706 | 12/1973 | Kaufman | 118/634 |

Primary Examiner—Bernard Nozick
Attorney, Agent, or Firm—Low & Matthews

[57] ABSTRACT

A method of and apparatus for collecting overspray materials from an article coating station wherein a velocity differential in the air stream of the duct system employed selectively transports and effects removal of solids from the overspray materials. A secondary filter removes fine mist and powdered coatings from the overspray. One section of the duct system is preferably made from disposable materials and a removable liner is preferably used in a collecting receptacle to facilitate clean up operations after the coating is completed.

5 Claims, 6 Drawing Figures

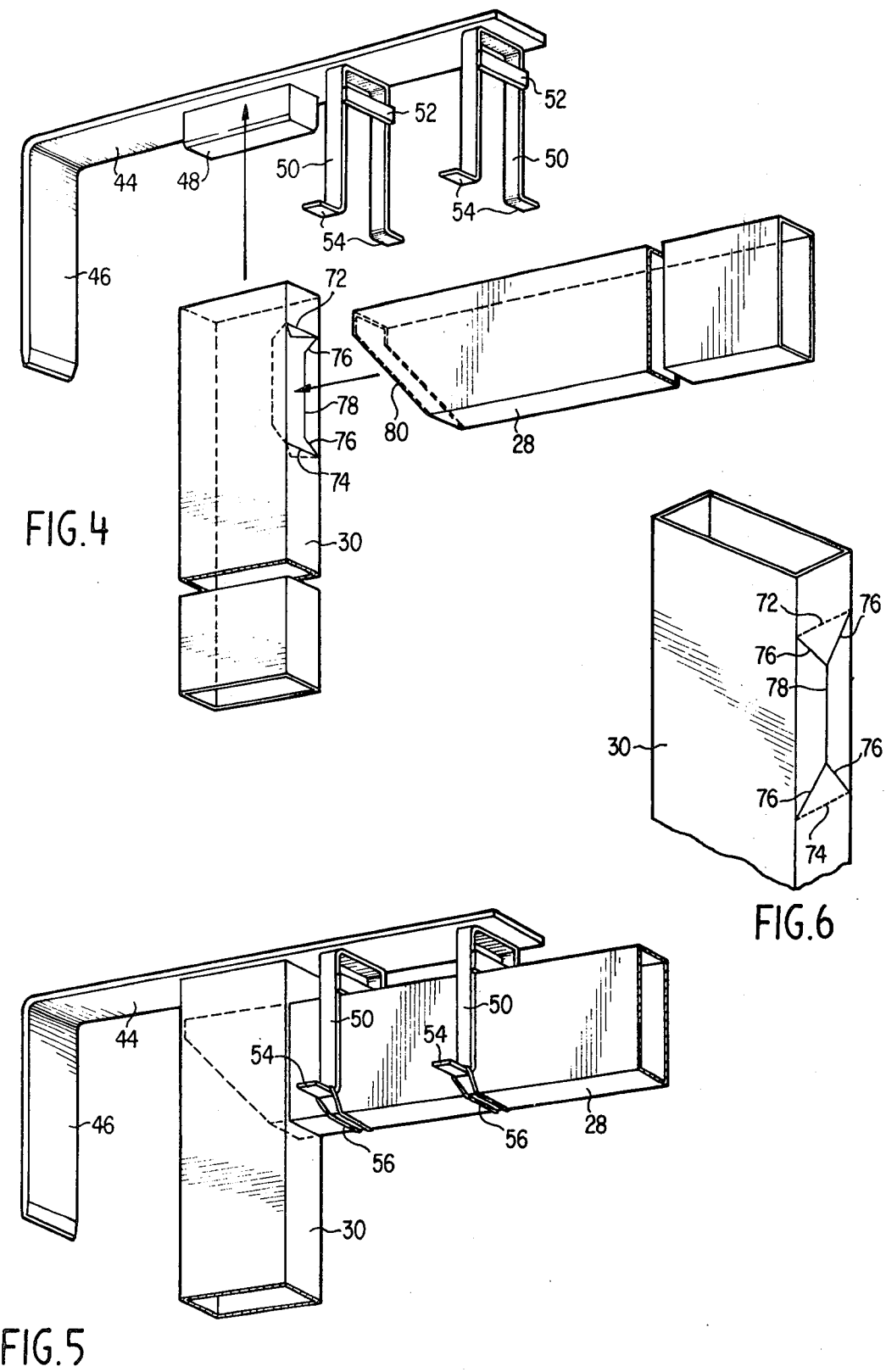

COATING FILTER, SEPARATOR AND COLLECTOR SYSTEM

This invention relates to a method of and apparatus for collecting overspray materials from an article coating station, and, more particularly, to such a method and apparatus wherein a velocity differential in the duct system partially made from disposable materials selectively transports and effects removal of solids from the overspray materials.

In the interest of economy of operation, it has become desirable to remove and reclaim the excess or overspray materials at article coating stations so that these overspray materials may be used again. While it is broadly known to employ pneumatic means to remove excess materials, the known prior art has employed installations which are difficult to clean up after use and which tend to become clogged and thereby malfunction after repeated usage.

The foregoing difficulties and shortcomings of the prior art are effectively overcome in the practice of the present invention which employs disposable items of ductwork for a first discrete section of the duct system which not only insures a rapid clean up operation after use but also insures that this portion of the duct system will not malfunction from being clogged.

In particular, the advantages of the present invention will become more apparent in considering the following method steps sequentially carried out for the collection of overspray materials from a coating system:

1. Positioning the inlet end of a duct system adjacent a coating station;
2. Making the duct system in at least first and second discrete sections;
3. Collecting any overspray materials at the coating station in an air flow through the duct system;
4. Establishing a velocity of air differential between the first and second discrete sections of the duct system sufficient to transport solids in the overspray materials in the first section of the duct system but insufficient to transport the overspray materials to the second section of the duct system; and
5. Collecting the overspray materials between the first and second sections of the duct system.

The method of the present invention may include the additional step of using a separate filter means to filter any fine mist and powdered coatings from the second section of the duct system. Additionally, the invention may include the additional step of making the first section of the duct system which extends from the coating station to the collecting receptacle from disposable materials, such as paper or cardboard. The invention has been practiced and the disposable materials replaced at a cost of about seven cents.

In a preferred form of the present invention, the air stream produced in the two duct systems originates from a single source and produces a vacuum pressure in the duct systems. For purposes of this invention, it is immaterial whether the duct system is considered to be two independent systems or one system having two discrete sections. What is significant is that a velocity of air differential is established between the two discrete sections or systems which is sufficient to transport solids in the overspray materials from the coating station to the collecting receptacle but which is insufficient to transport the solids to the second duct system so that the solids are deposited in the collecting receptacle. Velocity differentials from 50 feet per minute to 2,000 feet per minute have been employed with these velocity differentials being dependent upon the viscosity or weight of materials being separated from the air stream.

The inherent advantages and improvements of the present invention will become more readily apparent upon reference to the followed detailed description of the invention and by reference to the drawings in which:

FIG. 4 is an exploded perspective view showing the details of the inlet duct members and holders therefor prior to assembly;

FIG. 5 is a perspective view of the inlet duct members and holders therefor after being assembled; and FIG. 6 is a fragmentary perspective view of one of the inlet duct members illustrating the cut and creased areas thereon.

Figure 1:
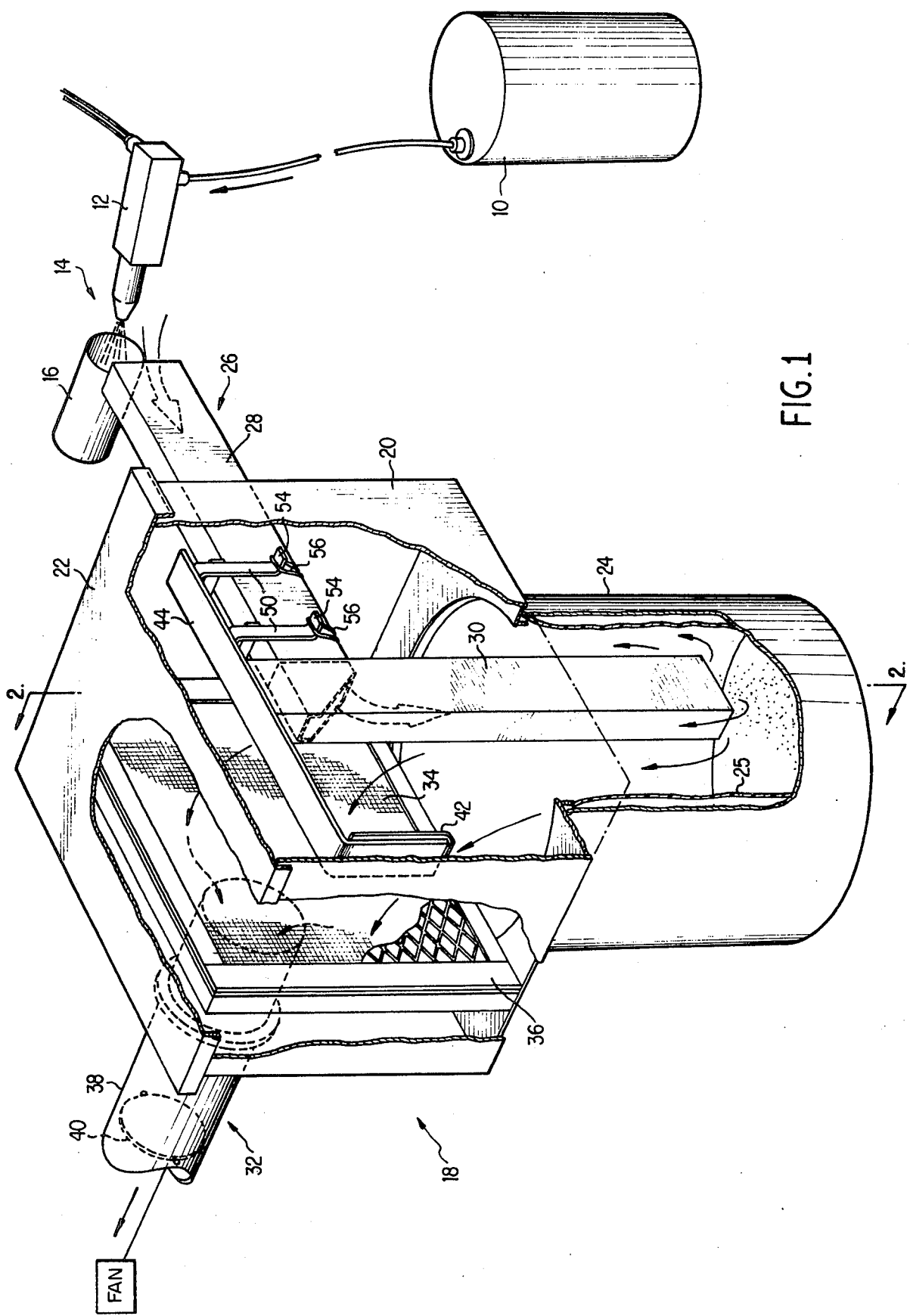
FIG. 1 is a perspective view with portions broken away illustrating the coating filter, separator and collector system of the present invention.

Referring now to FIG. 1 of the drawings, there is illustrated a coating supply unit 10 which supplies coating material to a suitable spray gun 12. This spray gun 12 may be electric, air-operated or manually operated insofar as the present invention is concerned. A coating station is indicated generally at 14 at which a container or other article 16 is being coated by spray gun 12.

In accordance with the present invention, means which include a main housing 18 is used to assist in supporting suitable duct work for removing the overspray materials from the coating station 14. The main housing 18 constitutes the main support means for the duct system of the present invention. The housing 18 includes a body 20 of a main box and a top cover member 22. Main housing 20 is positioned over and secured in a manner illustrated and described hereinafter to a receptacle or container 24 for collecting overspray coatings hereinafter referred to as collecting receptacle 24. A liner material 25 of either plastic or paper may be used to line the collecting receptacle 24 to facilitate the clean up operation.

A first duct system, or a discrete section of a duct system, is indicated generally at 26 and includes a disposable horizontally extending tubular section 28 and a disposable vertically extending tubular duct section 30. These two duct sections interfit at right angles to each other in a manner also described hereinafter. The duct system 26 has its inlet end positioned closely adjacent the coating station 14 whereby a vacuum pressure established in the duct system produces an air stream of sufficient velocity to transport the overspray materials from the coating station 14 through tubular ducts 28, 30 into the collecting receptacle 24. By virtue of the difference in cross sectional areas between the first duct system 26 and the cross sectional area within the collecting receptacle 24, the velocity differentials in the air stream are such that the solids contained within the overspray materials are not transported to a second duct system 32 but are deposited within the collecting receptacle 24.

The second duct system 32, or discrete duct section, leads to a source for creating the air streams within duct sections 26 and 32 such as a fan or blower means. The second duct system 32 includes a secondary filter 34 which is supported in a suitable frame 36 and an outlet duct 38 which contains a damper 40 to control the air velocity therein, if necessary.

Figure 2:
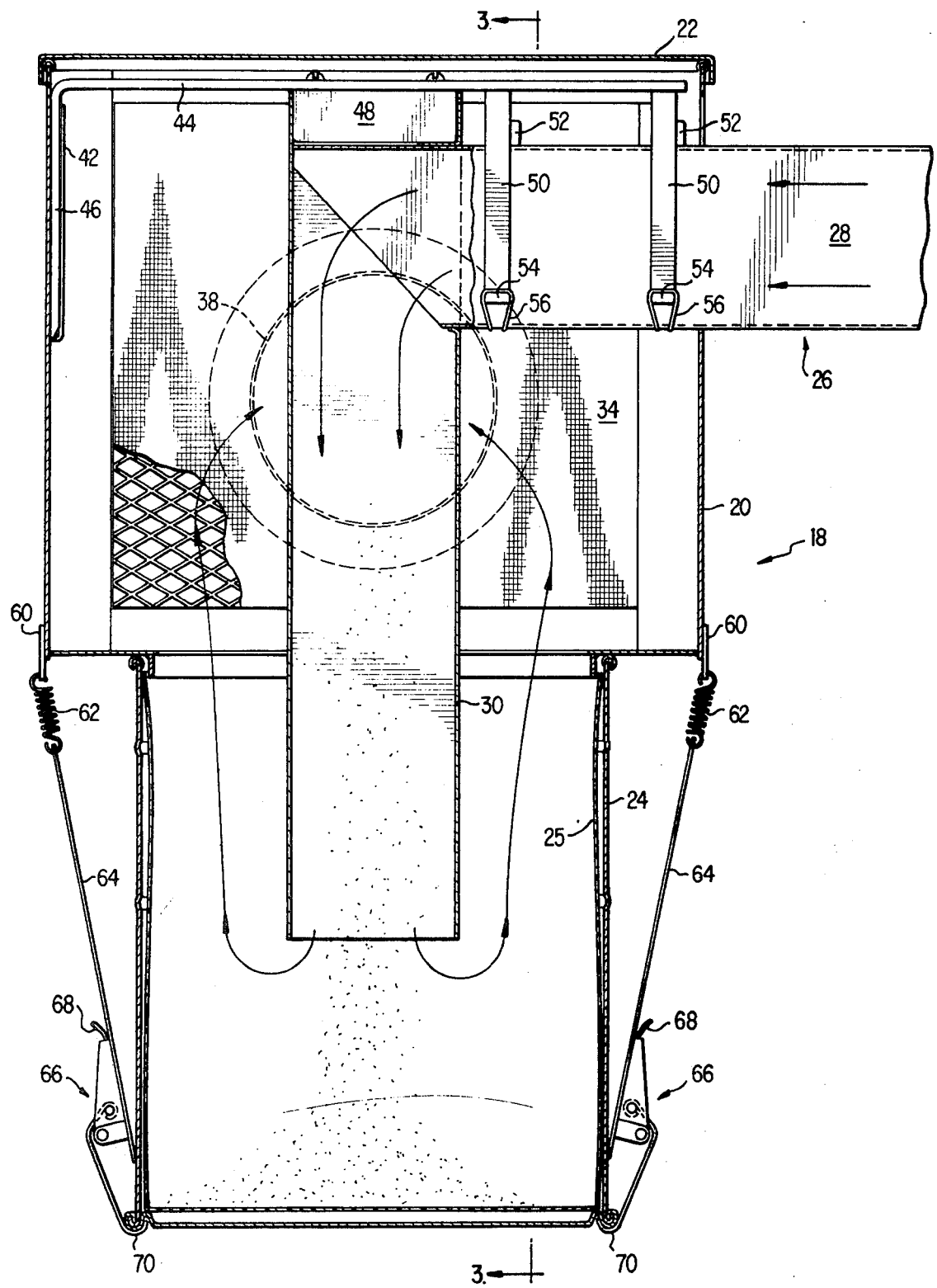
FIG. 2 is an elevational view taken in vertical cross section along line 2—2 of FIG. 1.
Figure 3:
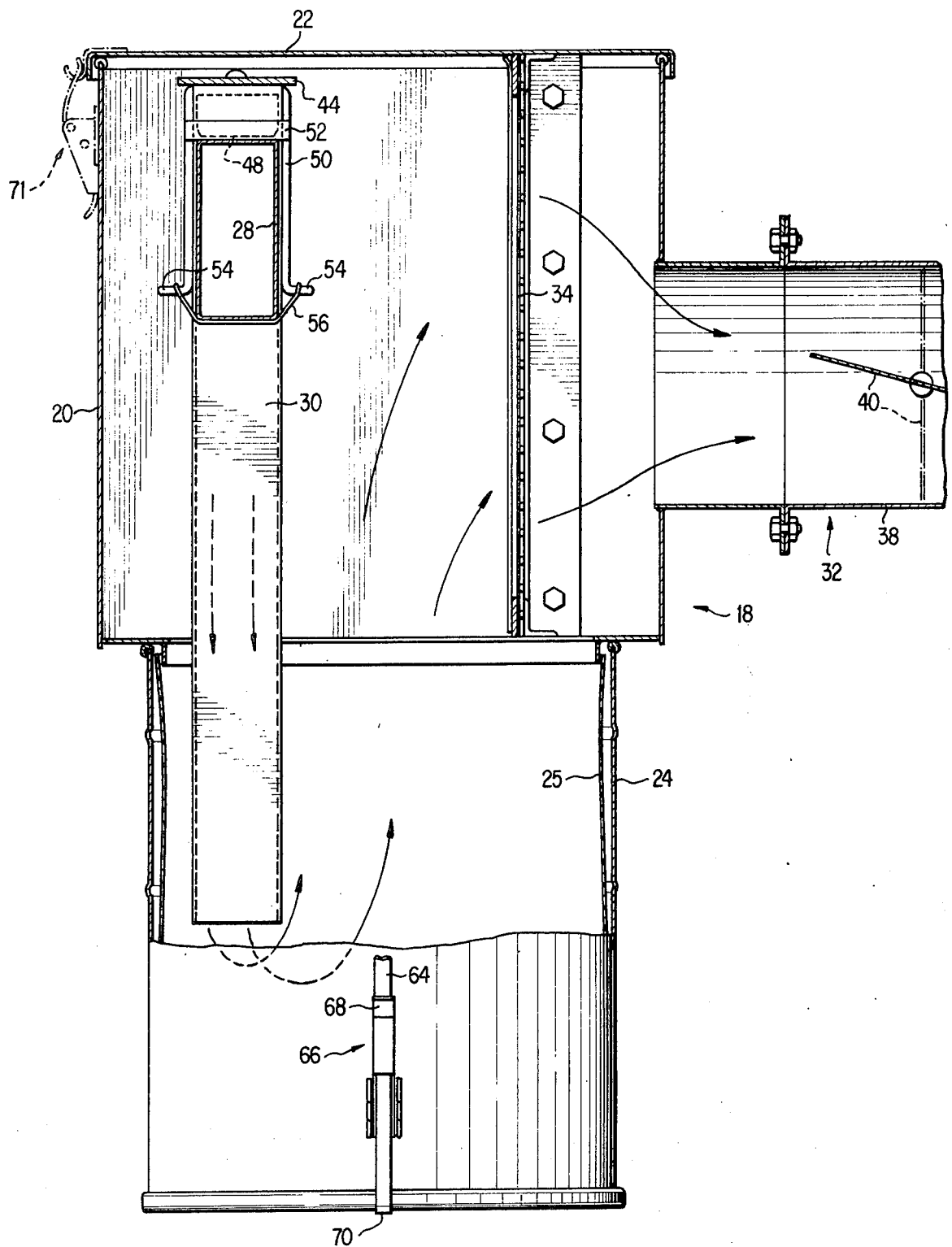
FIG. 3 is an elevational view taken in vertical cross section along line 3—3 of FIG. 2.

Referring now to FIGS. 1 and 2, there is illustrated a mounting bracket 42 for the first duct system 26. A tube support frame for the first duct system includes an L-shaped member having a long leg 44 and a short leg 46 with the latter disposed within and supported by mounting bracket 42. The long leg 44 of the L-shaped tube support frame carries a plug insert member 48 which is frictionally received within the disposable tubular section 30 in a manner shown most clearly in FIG. 2. A plurality of depending legs 50 are arranged in pairs from and supported from beneath the long leg 44 of the tube support frame. Each leg 50 is provided with a laterally extending flange 54 at the lower extremity thereof. Each pair of depending legs 50 carry a cross stop 52 for defining the uppermost position for the top of the tubular duct section 28. The bottom of the cross stop 52 is in substantial alignment with the lowermost surface of the plug insert member 48. The depending legs 50 are spaced apart a distance substantially equal to the width of the disposable duct section 28 so that the latter may be received therewithin in the manner clearly shown in FIGS. 1-5 of the drawings. The disposable tubular duct section 28 is assembled at right angles to the disposable tubular duct section 30 in a manner generally indicated by the arrow in FIG. 4. The assembled sections are lifted vertically between the pairs of depending legs 50 and duct section 30 is telescoped over plug insert member 48 which frictionally engages the inside of duct section 30. Duct section 28 abuts against the cross stop members 52 and is supported from beneath by undersupport members 56 which are attached to flanges 54. In one form of the invention the undersupport members 56 comprise rubber bands which are attached to oppositely disposed flanges 54 and cradled beneath the underside of disposable tubular duct section 28.

A reference to FIG. 2 illustrates one suitable manner of attaching the main housing 18 to the collecting receptacle 24. Thus, eyelet members 60 are shown attached by suitable means, such as by welding, to the lower portion of the housing 18 as it rests upon the collecting receptacle 24. A spring 62 is inserted through the eyelet member 60 and rod 64 extends downwardly to an overtoggle clamp, indicated generally at 66, which has a locking and release lever 68 for purposes of locking and unlatching the main housing 18 to the collecting receptacle 24. Toggle clamp 66 also includes a chime engaging lever 70 engagable with the underside of the chime of the collecting receptacle 24. Lever 68 is shown in the locked position in FIG. 2 and movement of this lever in a direction away from the rod 64 releases the clamp making it possible to disassemble the chime engaging lever 70 from beneath the chime of the collecting receptacle 24 whereby the main housing member 18 may be lifted from the collecting receptacle 24. A top clamping member is illustrated in phantom at 71 in FIG. 3 with this clamping member being substantially identical to the clamp shown at 66 in FIG. 2. Top clamping member 71 is optional and is not used on suction models. In addition, a ground engaging support or stand, not shown, may be used to provide further support for the main housing 18.

Referring now to FIGS. 4 and 6 of the drawings, there is illustrated a manner in which disposable tubular duct sections 28 and 30 fit together. These disposable duct sections may be made from paper, for example, such as paperboard. The disposable tubular duct section 30 in FIG. 6 is shown to have an upper score 72 and a lower score 74 with diagonal cut scores being made at 76 and a vertical cut score being made at 78 which interconnects the cut scores 76. The disposable tubular duct section 28 is provided with a truncated end at 80 which facilitates the right angled turn of the air stream as is most clearly indicated in FIGS. 1 and 2 of the drawings to direct the air stream toward the collecting receptacle.

In accordance with the present invention, a high velocity of air is established at the inlet to the first duct system 26 which is in the order of magnitude of from 1,000 feet per minute to 10,000 feet per minute. As the air emerges from the bottom of the vertically disposed tubular duct section 30 it has a velocity from about 50 feet per minute to 2,000 feet per minute, respectively. The velocity differentials are dependent upon the viscosity or weight of materials being separated from the air stream. Thus, the velocity of air in the paper tubes is high enough to transport the overspray materials into the collecting receptacle but the velocity at the container is low enough so as not to be sufficient to transport the solid materials thereafter. Therefore, all solid materials are dropped into the collecting receptacle 24. The secondary filter 34 traps fine mist and powdered coatings and, for example, may comprise a first layer of cheesecloth or paper and a second layer support of cloth. The air is exhausted from the second duct system 32 by means of a fan, not shown, and proceeds to a point of further treatment or disposal.

The coating supply unit 10 may contain coatings used for protecting the inside of beverage or food cans. Coatings also may be used for decorations, painting and other uses. A liner 25 makes the clean up operations much easier. The first duct system 26 comprising the disposable tubular duct sections 28 and 30 are disposable as well as the liner 25 within the collecting receptacle 24. In addition to disposable material such as paper, and cardboard, other disposable material such as plastic may be used for the ducts 28 and 30.

While a presently preferred embodiment of the invention has been illustrated and described, it will be recognized that the invention may be otherwise variously embodied and practiced within the scope of the claims which follow.

What is claimed is:

1. An apparatus for collecting the overspray of a coating system which comprises:
   (a) a collection receptacle for receiving solid particles from the overspray of said coating system,
   (b) a main support means attachable to said collection receptacle,
   (c) a first duct system held by said main support means having an inlet end adapted to be positioned adjacent a coating station and an outlet end positioned within said collection receptacle,
   (d) a second duct system held by said main support means having an inlet end in fluid communication with the outlet end of said first duct system,
   (e) said first duct system being made from disposable materials and being in the form of a pair of interfitting tubular members,
   (f) said main support means including a tube support frame having a plug member over which a first of said pair of tubular members is telescoped and frictionally received thereon and the other of said tubular members is inserted through a side wall of the first tubular member and provided with a truncated end to provide a right angle turn for the overspray materials.

2. An apparatus for collecting the overspray of a coating system as defined in claim 1 wherein said first duct system is made from paper tubes.

3. An apparatus for collecting the overspray of a coating system as defined in claim 1 wherein said second duct system includes a secondary filter means held by said main support means for filtering fine mist and powdered coatings.

4. An apparatus for collecting the overspray of a coating system as defined in claim 1 including means to establish an air stream velocity concurrently in each of said duct systems of a magnitude which will transport solids in said overspray in said first duct system but which is insufficient to transport solids in said overspray to said second duct system.

5. An apparatus for collecting the overspray of a coating system as defined in claim 4 wherein said means to establish an air stream velocity in each of said duct systems establishes a vacuum pressure therein.

* * * * *